(12) United States Patent
Poppeq et al.

(10) Patent No.: US 7,879,407 B2
(45) Date of Patent: Feb. 1, 2011

(54) EXTREMELY SCRATCH-RESISTANT, HIGHLY ELASTIC COATING AGENTS BASED ON ALKOXYSILANES

(75) Inventors: Andreas Poppeq, Sendenhorst (DE); Guenter Klein, Muenster (DE); Michael Kutschera, Limburgerhof (DE)

(73) Assignee: BASF Corporation, Munster (DE)

( * ) Notice: Subject to any disclaimer, the term of this patent is extended or adjusted under 35 U.S.C. 154(b) by 324 days.

(21) Appl. No.: 11/576,347

(22) PCT Filed: Oct. 8, 2005

(86) PCT No.: PCT/EP2005/010867

§ 371 (c)(1), (2), (4) Date: Mar. 30, 2007

(87) PCT Pub. No.: WO2006/042658

PCT Pub. Date: Apr. 27, 2006

(65) Prior Publication Data

US 2008/0057207 A1    Mar. 6, 2008

(30) Foreign Application Priority Data

Oct. 19, 2004   (DE) .................... 10 2004 050 748

(51) Int. Cl.
*B05D 1/36* (2006.01)
*C08G 77/08* (2006.01)

(52) U.S. Cl. .................. 427/407.1; 528/12; 528/13; 528/16; 528/17

(58) Field of Classification Search ............ 427/407.1, 427/333, 340; 528/12, 13, 16, 17
See application file for complete search history.

(56) References Cited

U.S. PATENT DOCUMENTS 4,043,953 A    8/1977   Chang et al.

(Continued)

FOREIGN PATENT DOCUMENTS

DE           10237270 A1    3/2004

(Continued)

OTHER PUBLICATIONS

International Preliminary Report on Patentability for International application No. PCT/EP2005/010867 dated Apr. 24, 2007.

*Primary Examiner*—Michael Barr
*Assistant Examiner*—Ryan Schiro
(74) *Attorney, Agent, or Firm*—Cantor Colburn LLP (57) ABSTRACT

The invention relates to coating agents, containing (A) at least 50 wt. %, (in relation to the content of non-volatile substances in said coating agent), of at least one compound (A1) and/or (A1') comprising at least two reactive groups of formula (I): —X—SiR"x(OR')3-x, in which R'=hydrogen, alkyl or cycloalkyl, whereby the carbon chain can be interrupted by non-adjacent oxygen, sulphur or NRa groups, Ra=alkyl, cycloalkyl, aryl or aralkyl, X=a linear and/or branched alkene or cycloalkene group comprising between 2 and 20 carbon atoms, R"=alkyl, cycloalkyl, aryl or aralkyl, whereby the carbon chain can be interrupted by non-adjacent oxygen, sulphur or NRa groups, and x=0 to 2, (B) a catalyst for cross-linking the —Si(OR')3-x units, and (C) an organic solvent or a mixture of organic solvents. According to the invention, during the curing of the coating agents, the reactive groups (I) are cross-linked in such a way, that the following characteristics are noted during the nanoindentation test on the cured coating: elastic recovery of volume >86.5%; plastic deformation <3.5%; brittle deformation <10.0%.

7 Claims, 3 Drawing Sheets

U.S. PATENT DOCUMENTS

| | | |
|---|---|---|
| 4,499,150 A | 2/1985 | Dowbenko et al. |
| 4,499,151 A | 2/1985 | Dowbenko et al. |
| 4,640,868 A * | 2/1987 | Penn .................. 428/446 |
| 4,710,542 A | 12/1987 | Forgione et al. |
| 4,772,672 A * | 9/1988 | Isozaki et al. ............ 526/273 |

FOREIGN PATENT DOCUMENTS

| | | |
|---|---|---|
| EP | 0008127 A1 | 8/1979 |
| EP | 0245700 A2 | 11/1987 |
| EP | 0249201 A2 | 12/1987 |
| EP | 0276501 A2 | 8/1988 |
| EP | 0571073 A2 | 11/1993 |
| EP | 0549643 B1 | 9/1994 |
| WO | WO92/20643 A1 | 11/1992 |
| WO | WO94/22968 A1 | 10/1994 |
| WO | WO97/12945 A1 | 4/1997 |

* cited by examiner

Figure 1: Indentation element (Berkovich pyramid); plan view and side elevation

Figure 2: Measurement operation

Figure 3: Result, 3D view and cross section

EXTREMELY SCRATCH-RESISTANT, HIGHLY ELASTIC COATING AGENTS BASED ON ALKOXYSILANES

This application is a National Phase Application of Patent Application PCT/EP2005/010867 filed on 8 Oct. 2005, which claims priority to DE102004050748.1, filed 19 Oct. 2004.

The present invention relates to thermally curable coating materials with high scratch resistance and high rubber-elasticity, based on aprotic solvents and also based on alkoxysilanes, which are suitable in particular as topcoats, preferably clearcoat materials, for OEM line finishing.

Coating materials comprising binders based on poly(meth)acrylates which contain lateral and/or terminal alkoxysilane groups are known for example from patents and patent applications U.S. Pat. No. 4,043,953, U.S. Pat. No. 4,499,150, U.S. Pat. No. 4,499,151, EP-A-0 549 643 and WO-A-92/20643. The poly(meth)acrylates described there may include up to 70% by weight of comonomers containing alkoxysilane groups, based on all of the comonomers employed. The coating materials are cured with catalysis by Lewis acids and optionally in the presence of small amounts of water, with the formation of Si—O—Si networks. The coating materials are used inter alia as clearcoat materials in OEM systems. Although such clearcoats already exhibit high scratch resistance and a comparatively good weathering stability, they have deficiencies in elasticity which make it difficult to use them as heavy-duty OEM clearcoat materials.

EP-A-0 267 698 describes solventborne coating materials whose binder constituents include (1) crosslinkable adducts containing alkoxysilane groups, obtainable by successively reacting polyisocyanates with hydroxyalkyl (meth)acrylates (Michael reaction) and then with amino-alkylalkoxysilanes, and (2) poly(meth)acrylates which contain lateral and/or terminal alkoxysilane groups. The readily accessible amine groups in the adducts, formed in the course of the Michael reaction, lead to a reduction in the water resistance of the cured coatings. Moreover, in the curing operation, these amine groups can react with the —Si(O-alkyl)$_3$ groups to form Si—N—C nodes, which are unstable to hydrolysis and lead to reduced chemicals resistance of the resultant coating. Coating materials of this kind also have deficiencies in terms of elasticity.

U.S. Pat. No. 4,598,131 describes solventborne coating materials comprising crosslinkable adducts containing alkoxy-silane groups, obtainable by successively reacting tetraalkyl orthosilicate with amino alcohols and then with polyisocyanates. As a result of their synthesis such adducts contain unwanted Si—O—C and/or Si—N—C nodes, which are unstable to hydrolysis and lead to a reduced chemicals resistance of the resultant coating. Moreover, coating materials of this kind also have deficiencies in terms of rubber-elasticity.

EP-A-0 571 073 describes solventborne coating materials which include as binder constituents (1) crosslinkable adducts of polyisocyanates containing more than one tertiary isocyanate group and aminoalkylalkoxysilanes and (2) poly(meth)acrylates which contain lateral and/or terminal alkoxysilane groups. The resultant coatings, although of comparatively high scratch resistance, have a rubber-elasticity which is still inadequate, particularly in the case of heavy-duty applications.

DE-A-102 37 270 embraces coating materials comprising crosslinkable adducts of isocyanatomethylalkoxysilanes and polyols. The isocyanatomethylalkoxysilanes used in the synthesis are highly toxic and therefore cannot be used without reservation in standard production processes. In particular in the context of their application as automotive clearcoat material, these coating materials also have deficiencies in their surface properties, particularly after loads, such as washing operations, for example. Moreover, there is a need for optimization in terms of the elasticity, in the sense of the rubber-elasticity, of the coatings produced with coating materials of this kind.

PROBLEM AND SOLUTION

The problem addressed by the present invention was to provide coating materials, preferably for heavy-duty OEM clearcoat materials, which in particular do not exhibit the rubber-elasticity deficiencies of the prior-art coatings. A further problem addressed by the invention was to provide coatings which meet the exacting requirements relating to scratch resistance, chemicals resistance and weather stability which obtain for OEM clearcoat materials.

The coatings ought to have a high level of scratch resistance and ought in particular to exhibit a high level of gloss retention after scratching load. In particular the coatings and coating systems, especially the clearcoats, ought to be producible even in coat thicknesses >40 µm without the incidence of stress cracks. This is an essential prerequisite for the use of the coatings and coating systems, particularly the clearcoats, in the particularly technologically and esthetically demanding field of automotive OEM finishing. In this case they must in particular exhibit a particularly high carwash resistance, which is manifested in the practice-oriented AMTEC carwash test by a residual gloss (20° C.) after cleaning in accordance with DIN 67530 of >70% of the original gloss.

Moreover, the new coating materials ought to be preparable easily and with very high reproducibility, and ought not to cause any environmental problems during coating-material application.

The invention accordingly provides thermosetting coating materials comprising (A) at least 50% by weight, based on the amount of nonvolatile substances in the coating material, of at least one compound (A1) and/or (A1') containing at least two reactive groups of the formula I $$—X—SiR''_x(OR')_{3-x} \quad (I)$$

where

R'=hydrogen, alkyl or cycloalkyl, the carbon chain being uninterrupted or interrupted by nonadjacent oxygen, sulfur or NRa groups, where Ra=alkyl, cycloalkyl, aryl or aralkyl, X=linear and/or branched alkylene or cycloalkylene radical having 2 to 20 carbon atoms, R''=alkyl, cycloalkyl, aryl or aralkyl, the carbon chain being uninterrupted or interrupted by nonadjacent oxygen, sulfur or NRa groups, and x=0 to 2, (B) a catalyst for the crosslinking of the —Si(OR')$_{3-x}$ units, and (C) an aprotic solvent or a mixture of aprotic solvents, the reactive groups (I) being crosslinked, in the course of curing of the coating materials, such that nanoindentation testing on the cured coat results in the following properties:

(a) elastic volume recovery >86.5%, preferably >88%, more preferably >89.5%, in particular >91%

(b) plastic deformation <3.5%, preferably <3%, more preferably <2.5%, in particular <2%

(c) brittle deformation <10.0%, preferably <9%, more preferably <8%, in particular <7%.

In the light of the prior it was surprising and unforeseeable for the skilled worker that the problems on whose addressing the present invention is based would be solved by means of the coating material of the invention.

Component (A) of the invention can be prepared with particular simplicity and causes no significant toxicological or environmental problems in the course of coating-material application.

The coating materials of the invention can be prepared with very high reproducibility and when used in the liquid state were adjustable to solids contents >40% by weight, preferably >45% by weight, in particular >50% by weight, without detriment to their very good transport properties, storage stability and processing properties, particularly their application properties.

The coating materials of the invention provide new coatings and coating systems, especially clearcoats, which are of high scratch resistance and high elasticity. The chemicals resistance of the coatings is excellent. Additionally the coatings and coating systems of the invention, especially the clearcoats, can be produced even in coat thicknesses >40 μm without incidence of stress cracks. Accordingly the coatings and coat systems of the invention, especially the clearcoats, can be used in the particularly technologically and esthetically demanding field of automotive OEM finishing. In that context they are notable in particular for a particularly high carwash resistance and scratch resistance, which can be underlined on the basis of the practically oriented AMTEC carwash test by a residual gloss (20°) after cleaning in accordance with DIN 67530 of >70% of the original gloss.

DESCRIPTION OF THE INVENTION

Component (A) of the Coating Material

Component (A) of the coating material of the invention contains at least 50% by weight, based on the amount of nonvolatile substances in the coating material, of at least one compound (A1) and/or (A1') containing at least two reactive groups of the formula I (I)

where

R'=hydrogen, alkyl or cycloalkyl, the carbon chain being uninterrupted or interrupted by nonadjacent oxygen, sulfur or NRa groups, where Ra=alkyl, cycloalkyl, aryl or aralkyl, X=linear and/or branched alkylene or cycloalkylene radical having 2 to 20 carbon atoms, R"=alkyl, cycloalkyl, aryl or aralkyl, the carbon chain being uninterrupted or interrupted by nonadjacent oxygen, sulfur or NRa groups, and x=0 to 2.

In one preferred embodiment of the invention component (A) of the coating material comprises a polymethacrylate copolymer (A1) containing more than 70% by weight, preferably more than 72% by weight, more preferably more than 74% by weight, based on the entirety of the comonomers in the copolymer (A1), of free-radically polymerizable, ethylenically unsaturated compounds (a1) containing at least one reactive group of the formula I (I)

where

R'=hydrogen, alkyl or cycloalkyl, the carbon chain being uninterrupted or interrupted by nonadjacent oxygen, sulfur or NRa groups, where Ra=alkyl, cycloalkyl, aryl or aralkyl, R' preferably being alkyl of 1 to 6 carbon atoms, more preferably methyl and/or ethyl, X=linear and/or branched alkylene or cycloalkylene radical having 2 to 20 carbon atoms, X being preferably alkylene of 2 to 6 carbon atoms, more preferably alkylene of 2 to 4 carbon atoms, R"=alkyl, cycloalkyl, aryl or aralkyl, the carbon chain being uninterrupted or interrupted by nonadjacent oxygen, sulfur or NRa groups, R" preferably being alkyl of 1 to 6 carbon atoms, more preferably methyl and/or ethyl, and x=0 to 2, preferably x=0.

Particularly preferred compounds (a1) are described for example in EP-B1-0 549 643 (page 3 line 47 to page 4 line 34). Especially preferred compounds (a1) are acrylates and/or methacrylates containing reactive groups (I), such as gamma-acryloyloxypropyltrimethoxysilane, acryloyloxymethyltrimethoxysilane, methacryloyloxymethyltrimethoxysilane or, in particular, gamma-methacryloyloxypropyltrimethoxysilane.

The free-radically polymerizable, ethylenically unsaturated comonomer units (a2) present in the copolymer (A1) in fractions of <30% by weight, preferably <28% by weight, more preferably less than <26% by weight, based on the entirety of the comonomers, are free-radically polymerizable, ethylenically unsaturated compounds, preferably acrylates and/or methacrylates, optionally alkyl, cycloalkyl, aryl and/or aralkyl esters of acrylic acid and/or methacrylic acid which carry further reactive functional groups (f) different from the reactive groups of the formulae I and II. The reactive functional groups (f) may be radiation-crosslinking and/or thermally crosslinking groups that are known per se, such as vinyl, (meth)acryloyl or allyl groups as radiation-crosslinking groups, for example, and thermally crosslinking groups, such as epoxy, isocyanate, carbamate and/or amino groups, for example. The reactive functional groups (f) are preferably selected such that the curing of the coating materials is not accompanied, or is accompanied only to a very small extent, by the formation of Si—N—C and/or Si—O—C nodes that are unstable to hydrolysis. Particularly preferred compounds (a2) are alkyl and/or cycloalkyl esters of (meth)acrylic acid having 1 to 10 carbon atoms.

The fraction of component (A1) in the coating material of the invention amounts to at least 50% by weight, based on the amount of nonvolatile substances in the coating material, preferably at least 60% by weight, more preferably at least 70% by weight.

In a further, particularly preferred embodiment of the invention component (A) of the invention contains at least 50% by weight, based on the amount of nonvolatile substances in the coating material, of a compound (A1') containing at least one reactive group of the formula II (II)

where

R=hydrogen, alkyl, cycloalkyl, aryl or aralkyl, the carbon chain being uninterrupted or interrupted by nonadjacent oxygen, sulfur or NRa groups, with Ra=alkyl, cycloalkyl, aryl or aralkyl, R'=hydrogen, alkyl or cycloalkyl, the carbon chain being uninterrupted or interrupted by nonadjacent oxygen, sulfur or NRa groups, R' preferably being hydrogen and/or alkyl of 1 to 6 carbon atoms, more preferably methyl and/or ethyl,

X, X'=linear and/or branched alkylene or cycloalkylene radical of 2 to 20 carbon atoms, X, X' preferably being alkylene of 2 to 6 carbon atoms, more preferably alkylene of 2 to 4 carbon atoms, R''=alkyl, cycloalkyl, aryl or aralkyl, the carbon chain being uninterrupted or interrupted by nonadjacent oxygen, sulfur or NRa groups, R'' preferably being alkyl of 1 to 6 carbon atoms, more preferably methyl and/or ethyl, R'''=alkyl, cycloalkyl, aryl or aralkyl, the carbon chain being uninterrupted or interrupted by nonadjacent oxygen, sulfur or NRa groups, R''' preferably being alkyl of 1 to 6 carbon atoms, more preferably alkyl of 1 to 4 carbon atoms, n=0 to 2, preferably n=1 or 2,
m=0 to 2, preferably n=1 or 2,
o=0 or 1, preferably o=0,
m+n+o=2,
preferably m+n=2, and
x, y=0 to 2, preferably x=0.

Component (A1') containing the reactive groups of the formula II is preferably prepared by reacting at least one di- and/or polyisocyanates (PI) with at least one aminosilane of the formula III:

$$HN—(X—SiR''_x(OR')_{3-x})_n(X'—SiR''_y(OR')_{3-y})_m(R''')_o \qquad (III)$$

the substituents and indices being as defined above.

Particularly preferred aminosilanes (III) are N-methyl-2-aminoethyltrimethoxysilane, N-methyl-3-aminopropyl-trimethoxysilane, N-methyl-4-aminobutyltrimethoxysilane, N-methyl-2-aminoethyltriethoxysilane, N-methyl-3-aminopropyltriethoxysilane, N-methyl-4-aminobutyltriethoxysilane, the N-ethyl, N-propyl and N-butyl derivatives of the aforementioned compounds, and, in particular, bis(2-ethyltrimethoxysilyl)amine, bis(3-propyltrimethoxysilyl)amine, bis(4-butyltrimethoxysilyl)-amine, bis(2-ethyltriethoxysilyl)amine, bis(3-propyltriethoxysilyl)amine and/or bis(4-butyltriethoxysilyl)amine. Especially preferred for increasing the network density further is bis(3-propyltrimethoxysilyl)amine.

Aminosilanes of this kind are available for example under the brand name Dynasilan® from Degussa or Silquest® from OSI.

Preferred di- and/or polyisocyanates PI for preparing component (A1') are conventional substituted or unsubstituted aromatic, aliphatic, cycloaliphatic and/or heterocyclic polyisocyanates. Examples of preferred polyisocyanates are: toluene 2,4-diisocyanate, toluene 2,6-diisocyanate, diphenylmethane 4,4'-diisoyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, dodecane 1,12-diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Further-preferred polyisocyanates are the biuret dimers and the isocyanurate trimers of the aforementioned diisocyanates. Particularly preferred polyisocyanates PI are hexamethylene 1,6-diisocyanate, isophorone diisocyanate and 4,4'-methylenedicyclohexyl diisocyanate, their biuret dimers and/or isocyanurate trimers.

In a further embodiment of the invention the polyisocyanates PI are polyisocyanate prepolymers having urethane structural units, which are obtained by reacting polyols with a stoichiometric excess of the aforementioned polyisocyanates. Polyisocyanate prepolymers of this kind are described for example in U.S. Pat. No. 4,598,131.

Especially preferred components (A1') are: reaction products of hexamethylene 1,6-diisocyanate and isophorone diisocyanate, and/or their isocyanurate trimers with N-methyl-3-aminopropyltrimethoxysilane and/or, in particular, bis(3-propyltrimethoxysilyl)-amine.

The polyisocyanates are reacted with the aminosilanes preferably in an inert gas atmosphere at temperatures of not more than 100° C., preferably not more than 60° C. The resulting component (A1') includes, in accordance with the invention, at least one structural unit of the aforementioned formula (II); in accordance with the preparation method preferred in accordance with the invention preferably at least 90 mol % of the isocyanate groups of the polyisocyanate PI have undergone reaction with the aminosilanes (III), more preferably at least 95 mol %, to form structural units (II).

The fraction of component (A1') in the coating material of the invention amounts to at least 50% by weight, based on the amount of nonvolatile substances in the coating material, preferably at least 70% by weight, more preferably at least 80% by weight.

The Further Components of the Coating Material

As catalysts (B) for crosslinking the $—Si(OR')_{3-x(y)}$ units it is possible to use conventional compounds. Examples are Lewis acids (electron deficiency compounds), such as, for example, tin naphthenate, tin benzoate, tin octoate, tin butyrate, dibutyltin dilaurate, dibutyltin diacetate, dibutyltin oxide, lead octoate. Catalysts used are preferably metal complexes with chelate ligands. The compounds which form chelate ligands are organic compounds containing at least two functional group which are able to coordinate to metal atoms or metal ions. These functional groups are normally electron donors, which give up electrons to metal atoms or metal ions as electron acceptors. Suitable organic compounds are in principle all those of the stated type, provided they do not adversely affect, let alone entirely prevent, the crosslinking of the curable compositions of the invention to cured compositions of the invention. Catalysts which can be used include, for example, the aluminum and zirconium chelate complexes as described for example in the U.S. Pat. No. 4,772,672 A, column 8 line 1 to column 9 line 49. Particular preference is given to aluminum, zirconium, titanium and/or boron chelates, such as aluminum ethyl acetoacetate and/or zirconium ethyl acetoacetate. Particular preference extends to aluminum, zirconium, titanium and/or boron alkoxides and/or esters.

Also of particular preference as component (B) are nanoparticles. Such nanoparticles are preferably incorporated into the nodes at least partly during the crosslinking of the $—Si(OR')_{3-x(y)}$ units. The nanoparticles are preferably selected from the group consisting of metals and metal compounds, preferably metal compounds.

The metals are preferably selected from main groups three and four and transition groups three to six and one and two of the Periodic Table of the Elements and also the lanthanoids, and preferably from the group consisting of boron, aluminum, gallium, silicon, germanium, tin, zinc, titanium, zirconium, hafnium, vanadium, niobium, tantalum, molybdenum, tungsten and cerium. Use is made in particular of aluminum, silicon, titanium and/or zirconium.

The metal compounds are preferably oxides, oxide hydrates, sulfates, hydroxides or phosphates, especially oxides, oxide hydrates and hydroxides. Very particular preference is given to boehmite nano-particles.

The nanoparticles preferably have a primary particle size <50, more preferably 5 to 50, in particular 5 to 30 nm.

The catalyst component (B) is used preferably in fractions of from 0.01 to 30% by weight, more preferably in fractions of from 0.1 to 20% by weight, based on the nonvolatile constituents of the coating material of the invention.

Suitability as further component (C) is possessed by aprotic solvents, which in the coating material are chemically inert toward components (A) and (B) and also do not react with (A) and (B) when the coating material is cured. Examples of such solvents are aliphatic and/or aromatic hydrocarbons, such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl epoxypropinate, ethers, or mixtures of the aforementioned solvents. The solvents or solvent mixtures preferably have a water content of not more than 1% by weight, more preferably not more than 0.5% by weight, based on the solvent. In one preferred embodiment of the invention a mixture of components (A) and (C) is prepared first of all and in a further step is mixed with the remaining components of the coating material of the invention.

In a further embodiment of the invention use is made, as component (D), of further binders, which are able to form network nodes with the $Si(OR)_3$ groups of component (A) and/or with themselves, where appropriate with catalysis by component (B).

As component (D) it is possible for example to use further oligomers or polymers containing $Si(O-alkyl)_3$ groups, such as the poly(meth)acrylates referred to in the aforementioned patents and patent applications U.S. Pat. No. 4,499,150, U.S. Pat. No. 4,499,151 or EP-A-0 571 073. Components (D) of this kind, however, are used only in amounts such that the high weathering stability of the cured coating is maintained. In general such poly-(meth)acrylates containing —Si(O-alkyl)₃ groups are used in fractions of up to 40% by weight, preferably of up to 30% by weight, more preferably of up to 25% by weight, based on the nonvolatile constituents of the coating material.

As component (D) it is preferred to use amino resins and/or epoxy resins. Suitable amino resins are the customary and known resins, some of whose methylol and/or methoxy methyl groups may have been defunctionalized by means of carbamate or allophanate groups. Crosslinking agents of this kind are described in U.S. Pat. No. 4,710,542 and EP-B-0 245 700 and also in the article by B. Singh and coworkers, "Carbamyl-methylated Melamines, Novel Crosslinkers for the Coatings Industry", in Advanced Organic Coatings Science and Technology Series, 1991, Volume 13, pages 193 to 207.

Particularly preferred components (D) are epoxy resins, which react preferably with themselves with catalysis by component (B), more preferably aliphatic epoxy resins possessing a high weathering stability. Epoxy resins of this kind are described for example in the monograph by B. Ellis, "Chemistry and Technology of Epoxy Resins" (Blackie Academic & Professional, 1993, pages 1 to 35).

In general the components (D) are used in fractions of up to 40% by weight, preferably of up to 30% by weight, more preferably of up to 25% by weight, based on the nonvolatile constituents of the coating material. In selecting components (D) it should be ensured that the curing of the coating materials is not accompanied, or is accompanied only to a very small extent, by the formation of Si—N—C and/or Si—O—C nodes that are unstable to hydrolysis.

The coating material of the invention may further comprise at least one customary and known coatings additive in effective amounts, i.e., in amounts preferably up to 30% by weight, more preferably up to 25% by weight and in particular up to 20% by weight, based in each case on the nonvolatile constituents of the coating material.

Examples of suitable coatings additives are:

in particular, UV absorbers;

in particular, light stabilizers such as HALS compounds, benzotriazoles or oxalanilides;

free-radical scavengers;

slip additives;

polymerization inhibitors;

defoamers;

reactive diluents, such as are general knowledge from the prior art, which preferably do not react with the —Si(OR')₃ groups of component (A) with the formation of —Si—O—C and/or —Si—N—C nodes;

wetting agents such as siloxanes, fluorine compounds, carboxylic hemiesters, phosphoric esters, polyacrylic acids and copolymers thereof or polyurethanes;

adhesion promoters such as tricyclodecanedimethanol;

leveling agents;

film-forming auxiliaries such as cellulose derivatives;

fillers other than component (B), such as nanoparticles based on silica, alumina or zirconium oxide; for further details refer to Römpp Lexikon "Lacke and Druckfarben", George Thieme Verlag, Stuttgart, 1998, pages 250 to 252;

rheology control additives such as those from patents WO 94/22968, EP-A-0 276 501, EP-A-0 249 201 or WO 97/12945; crosslinked polymeric micro-particles, as disclosed for example in EP-A-0 008 127; inorganic phyllosilicates such as aluminum magnesium silicates, sodium magnesium and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified ethoxylated urethanes or polyacrylates;

and/or flame retardants.

In a further embodiment of the invention the coating material of the invention may further comprise additional pigments and/or fillers and be used for producing pigmented topcoats. The pigments and/or fillers employed for this purpose are known to the skilled worker.

Adhering outstandingly even to already cured electrocoats, surfacer coats, basecoats or customary and known clearcoats, the coatings of the invention produced from the coating materials of the invention are suitable not only for use in automotive OEM finishing but also superlatively for automotive refinish or for scratchproofing exposed areas on coated automobile bodies.

The coating materials of the invention can be applied by any of the customary application methods, such as spraying, knife coating, brushing, flow coating, dipping, impregnating, trickling or rolling, for example. The substrate to be coated may itself be stationary, with the application equipment or unit being in motion. Alternatively the substrate to be coated, especially a coil, may be in motion, with the application unit being stationary relative to the substrate or being in appropriate motion.

It is preferred to employ spray application methods, such as compressed-air spraying, airless spraying, high-speed rotation, or electrostatic spray application (ESTA), in conjunction where appropriate with hot spray application such as hot-air spraying, for example. Curing of the applied coating materials of the invention may take place after a certain rest time. This rest time is used, for example, for the leveling and degassing of the coating films or for the evaporation of volatile constituents such as solvents. The rest time may be assisted and/or shortened by application of elevated temperatures and/or by a reduced air humidity, provided that this does not entail any damage or change to the coating films, such as premature complete crosslinking.

The thermal curing of the coating materials has no particular features as far as its method is concerned, but instead takes place in accordance with the conventional methods such as heating in a forced-air oven or exposure to IR lamps. Thermal curing may also take place in stages. Another preferred curing method is that of curing with near infrared (NIR) radiation.

Thermal curing takes place advantageously at a temperature of 50 to 200° C., more preferably 60 to 190° C. and in particular 80 to 180° C., for a time of 1 min to 5 h, more preferably 2 min to 2 h and in particular 3 min to 90 min.

The coating materials of the invention provide new cured coatings, especially coating systems, especially clearcoats, moldings, especially optical moldings, and self-supporting sheets which are of high scratch resistance and in particular possess chemical stability and weathering stability. The coatings and coating systems of the invention, especially the clearcoats, can also be produced in particular in coat thicknesses >40 μm without incidence of stress cracks.

The elastic properties of the coating of the invention are characterized by the deformation of the topmost coating film (skin) using a nanoindenter, and are expressed in the categories "elastic", "plastic" and "brittle". The damage (deformation) employed for the test ought to extend to a depth of not more than 3 μm, preferably not more than 1.5 μm.

The features of the coating of the invention are characterized by the following values:

|  | Elastic | Plastic | Brittle |
| --- | --- | --- | --- |
| inventive | 86.5% | 3.5% | 10% |
| preferably at least | 88% | 3% | 9% |
| more preferably at least | 89.5% | 2.5% | 8% |
| in particular at least | 91% | 2% | 7% |

Instruments suitable for determining the proportions of the deformation are supplied for example by Surface, Hückelhoven under the brand name Hysitron TriboIndenter®.

Figure 1:
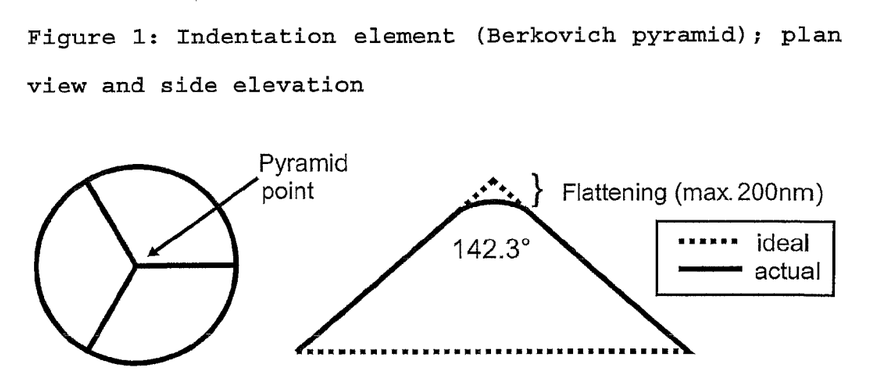
FIG. 1 provides plan view and side elevation illustrations of an indentation element that is a three-sided diamond pyramid in Berkovich geometry.
Figure 2:
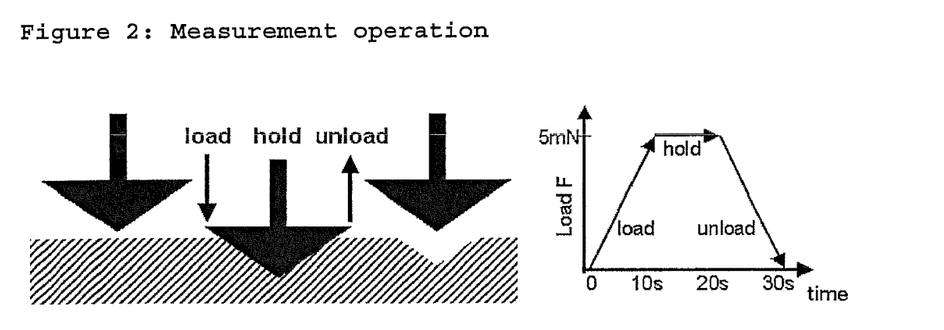
FIG. 2 provides an illustration of the measurement operation employing the indentation element of FIG. 1.

The tests are carried out as follows: the indentation element used is a three-sided diamond pyramid in Berkovich geometry (included angle 142.3°). The deviation from the ideal pointed pyramidal shape (flattening) must not be more than 200 nm (FIG. 1). This element is then pressed into the coating surface for 10 s, with the force increasing linearly to a maximum of 5 mN, is held there at maximum force for a further 10 s, and over the next 10 s is withdrawn from the surface with a linearly descending force (FIG. 2).

Figure 3:
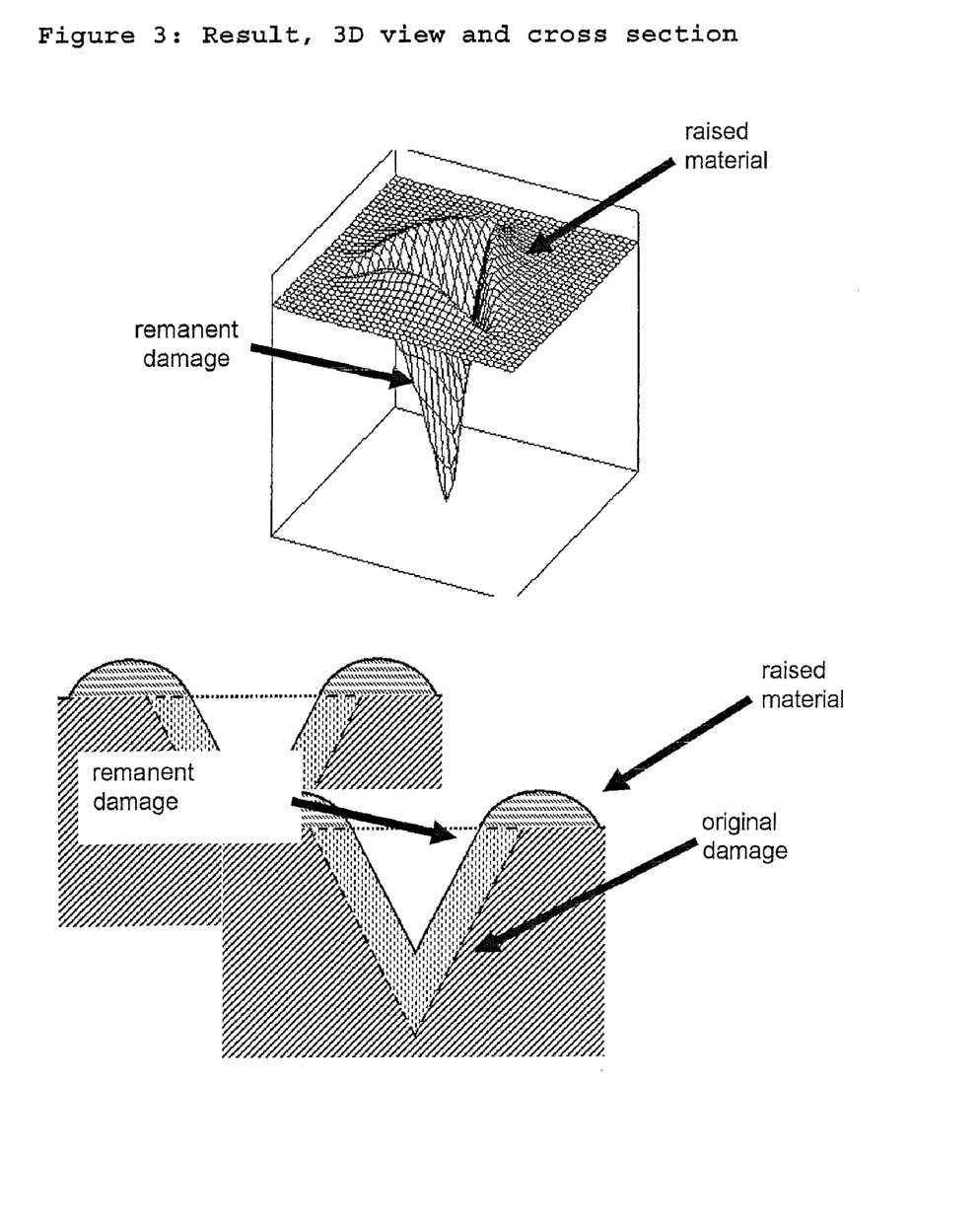
FIG. 3 provides a graphical illustration of the remanent damage resulting from the measurement operation illustrated in FIG. 2.

The remanent damage (FIG. 3) is measured three-dimensionally 10 minutes after the original damage. From the volume proportions of the original damage, the remanent damage and the raised material, the values of the categories are then determined as follows:

elastic: $(volume_{original} - volume_{remanent})/volume_{original} * 100\%$ plastic: $(volume_{raised})/volume_{original} * 100\%$ brittle: $(volume_{remanent} - volume_{raised})/volume_{original} * 100\%$ The coating materials of the invention are outstandingly suitable for use as decorative, protective and/or effect-providing coatings and coating systems, possessing high scratch resistance and high elasticity, on bodies of means of transport (especially motor vehicles, such as motorcycles, buses, trucks or automobiles) or parts thereof; on constructions, interior and exterior; on furniture, windows and doors; on plastics moldings, especially CDs and windows; on small industrial parts, on coils, containers, and packaging; on white goods; on sheets; on optical, electrical and mechanical components, and on hollow glassware and articles of everyday use.

The coating materials and coating systems of the invention, especially the clearcoats, are employed particularly in the especially technologically and esthetically demanding field of automotive OEM finishing. With particular preference the coating materials of the invention are employed in multistage coating processes, particularly in processes where a substrate which may or may not be precoated has applied to it first a pigmented basecoat film and then a film comprising the coating material of the invention. Processes of this kind are described for example in U.S. Pat. No. 4,499,150. Particular qualities which are manifested here include a particularly high chemicals resistance and weathering stability and also a very good carwash resistance and scratch resistance, as demonstrated by means of the practically oriented AMTEC carwash test by a residual gloss (20°) after cleaning in accordance with DIN 67530 of >70%, preferably >80% of the original gloss.

EXAMPLES

Preparation Example 1

Preparation of a Suitable Catalyst (Component (B))

In order to ensure sufficient curing of the clearcoat material a suitable catalyst was prepared first of all. For that purpose 13.01 parts by weight of ethyl acetoacetate were added slowly at room temperature to 20.43 parts by weight of aluminum sec-butoxide in a round-bottomed flask, with stirring and cooling during the addition. Thereafter the reaction mixture was stirred further at room temperature for 1 h.

Preparation Example 2

Preparation of a Silanized diisocyanate (HDI with bisalkoxysilylamine) (Component A1))

A three-necked glass flask equipped with a reflux condenser and a thermometer is charged with 30.4 parts of trimerized hexane diisocyanate (HDI) (Basonat HI 100) and 15.2 parts of solvent naphtha. Under nitrogen blanketing and with stirring, 54.4 parts of bis[3-(trimethoxysilyl)propyl]amine (Silquest A 1170) are metered in at a rate such that 50° C. are not exceeded. After the end of the addition the reaction temperature is held at 50° C. Complete blocking is determined by means of the titration described above.

The blocked isocyanate obtained in this way is stable on storage at room temperature for more than one month at 40°

C. and following the addition of an aluminum catalyst could be applied as a 2K (two-component) clearcoat material.

Formulation of Scratch-Resistant and Chemicals-Resistant Coating Materials

To formulate highly scratch-resistant and chemicals-resistant coating materials 90% by weight of the diisocyanate adduct (A1) described in Preparation Example 2 was admixed with 10% by weight of the catalyst (B) described in Preparation Example 1. The resulting coating materials were applied and baked at 140° C. for 22 minutes. The scratch resistance of the surfaces of the resultant coating 2 was investigated by means of the steel wool test. The chemicals resistance was investigated by means of the BART test. The corresponding results are compiled in Table 1.

TABLE 1

Properties of the coating produced with the coating material of the invention

| Characterization with nanoindenter | Coating |
|---|---|
| Elastic volume recovery (%) | 95.34 |
| Plastic deformation (%) | 0.51 |
| Brittle deformation (%) | 4.15 |
| Steel wool scratch test after 10 BAFS [rating] | 1 |
| BART test [rating] | |
| $H_2SO_4$ 10% strength | 1 |
| $H_2SO_4$ 36% strength | 1 |
| HCl 10% strength | 1 |
| $H_2SO_3$ 6% strength | 1 |
| NaOH 5% strength | 1 |
| DI $H_2O$ | 0 |

Characterization with the nanoindenter was carried out as described above.

The steel wool scratch test was carried out using a hammer to DIN 1041 (weight without shaft: 800 g; shaft length: 35 cm). The test panels were stored at room temperature for 24 hours prior to the test.

The flat side of the hammer was wrapped with one ply of steel wool and fastened to the raised sides using Tesakrepp tape. The hammer was placed onto the clearcoats at right angles. The weighted part of the hammer was guided over the surface of the clearcoat in a track, without tipping and without additional physical force.

For each test 10 back-and-forth strokes (BAFS) were performed by hand. After each of these individual tests the steel wool was replaced.

Following application of the load, the areas under test were cleaned with a soft cloth to remove the residues of steel wool. The areas under test were evaluated visually under artificial light and rated as follows:

| Rating | Damage |
|---|---|
| 1 | none |
| 2 | little |
| 3 | slight |
| 4 | slight to moderate |
| 5 | severe |
| 6 | very severe |

Evaluation took place immediately after the end of the test.

The BART (BASF ACID RESISTANCE TEST) was used to determine the resistance in the clearcoat to acids, alkalis and water drops. In this test the clearcoat was exposed to a temperature load in a gradient oven after baking at 40° C. for 30 minutes. Previously the test substances (10% and 36% strength sulfuric acid; 6% sulfurous acid, 10% strength hydrochloric acid; 5% strength sodium hydroxide solution, DI (i.e., fully demineralized or deionized) water—1,2,3 or 4 drops) had been applied in a defined manner using a volumetric pipette. After the substances had been allowed to act they were removed under running water and the damage was assessed visually after 24 h in accordance with a predetermined scale:

| Rating | Appearance |
|---|---|
| 0 | no defect |
| 1 | slight marking |
| 2 | marking/dulling/no softening |
| 3 | marking/dulling/color change/softening |
| 4 | cracks/incipient etching |
| 5 | clearcoat removed |

Each individual mark (spot) was evaluated and the result was reported in the form of a rating for each test substance.

Additionally the AMTEC test in accordance with DIN 67530 was carried out on coating 2, with the following results (gloss at 20°):

| | |
|---|---|
| Initial gloss: | 88 |
| Gloss after damage: | 84, i.e., 95.5% of the |
| with cleaning: | original gloss |
| Reflow time (min): | 120 |
| Reflow temperature (° C.): | 80 |
| Gloss after reflow: | 83, i.e., 94.3% of the |
| with cleaning: | original gloss |

What is claimed is:

1. A coated article comprising a substrate having thereon a cured layer of a coating material comprising
   (A) at least 50% by weight, based on the amount of nonvolatile substances in the coating material, of at least one compound (A1') comprising an adduct of polyisocyanate and alkoxysilane, and further wherein (A1') comprises at least one reactive group of the formula II:

(II)

where
   R is a hydrogen, alkyl, cycloalkyl, aryl or aralkyl, the carbon chain being uninterrupted or interrupted by nonadjacent oxygen, sulfur or NRa groups, where Ra is an alkyl, cycloalkyl, aryl or aralkyl,
   X is a linear and/or branched alkylene or cycloalkylene radical of 2 to 20 carbon atoms,
   X' is a linear and/or branched alkylene or cycloalkylene radical of 2 to 20 carbon atoms,
   R' is hydrogen, alkyl or cycloalkyl, wherein the carbon chain of the alkyl cycloalkyl is uninterrupted or interrupted by nonadjacent oxygen, sulfur or NRa groups,
   R" is an alkyl, cycloalkyl, aryl or aralkyl, wherein the carbon chain of the alkyl, cycloakyl or aralkyl is uninterrupted or interrupted by nonadjacent oxygen, sulfur or NRa groups,
   R'" is an alkyl, cycloalkyl, aryl or aralkyl, wherein the carbon chain of the alkyl, cycloakyl or aralkyl is uninterrupted or interrupted by nonadjacent oxygen, sulfur or NRa groups,
   n=0 to 2,
   m=0 to 2,
   o=0 or 1,
   x=0 to 2,
   m+n+o=2, and
   y=0 to 2, (B) a catalyst for the crosslinking of the —Si(OR')$_{3-x}$ units selected from the group consisting of boron chelates, boron alkoxides, boron esters, aluminum chelates, aluminum alkoxides, aluminum esters, titanium chelates, titanium alkoxides, titanium esters, zirconium chelates, zirconium alkoxides, zirconium esters and nanoparticles of compounds of the elements aluminum, silicon, titanium or zirconium, and (C) an aprotic solvent or a mixture of aprotic solvents, wherein the reactive groups (II) are crosslinked in the course of curing the coating material, and further wherein said cured layer has a thickness of at least 40 μm and exhibits properties upon nanoindentation testing as follows:

a. elastic volume recovery >86.5%,
b. plastic deformation <3.5%,
c. brittle deformation <10.0%.

2. The coated article of claim 1, wherein X is alkylene of 2 to 4 carbon atoms.

3. The coated article of claim 1, wherein m+n=2 in formula II.

4. The coated article of claim 1, wherein the aprotic solvent (C) has a water content of not more than 1% by weight, based on the solvent.

5. The coated article of claim 1, wherein the coating material further comprises up to 40% by weight of a component (D), based on the amount of nonvolatile substances, wherein component (D) is able to form network nodes with the Si(OR')$_3$ groups of component (A), with itself and/or with a further reactant.

6. The coated article of claim 1 wherein said cured layer is a clearcoat layer, and further comprising a cured pigmented basecoat layer comprising a polymeric binder and a pigment between said clearcoat layer and said substrate.

7. A coated article comprising a substrate having thereon a cured layer of a coating material comprising (A) at least 50% by weight, based on the amount of nonvolatile substances in the coating material, of at least one compound (A1') comprising an adduct of polyisocyanate and alkoxysilane, and further wherein (A1') comprises at least one reactive group of the formula II:

—NR—C(O)—N—(X—Si$_x$(OR')$_{3-x}$)$_n$(X'—SiR''$_y$(OR')$_{3-y}$)$_m$(R''')$_o$   (II)

where

R is a hydrogen, alkyl, cycloalkyl, aryl or aralkyl, the carbon chain being uninterrupted or interrupted by nonadjacent oxygen, sulfur or NRa groups, where Ra is an alkyl, cycloalkyl, aryl or aralkyl, X is a linear and/or branched alkylene or cycloalkylene radical of 2 to 20 carbon atoms, X' is a linear and/or branched alkylene or cycloalkylene radical of 2 to 20 carbon atoms, R' is hydrogen, alkyl or cycloalkyl, wherein the carbon chain of the alkyl cycloalkyl is uninterrupted or interrupted by nonadjacent oxygen, sulfur or NRa groups, R'' is an alkyl, cycloalkyl, aryl or aralkyl, wherein the carbon chain of the alkyl, cycloakyl or aralkyl is uninterrupted or interrupted by nonadjacent oxygen, sulfur or NRa groups, R''' is an alkyl, cycloalkyl, aryl or aralkyl, wherein the carbon chain of the alkyl, cycloakyl or aralkyl is uninterrupted or interrupted by nonadjacent oxygen, sulfur or NRa groups, n=0 to 2,
m=0 to 2,
o=0 or 1,
x=0 to 2,
m+n+o=2, and
y=0 to 2, (B) a catalyst, selected from the group consisting of boron chelates, boron alkoxides, boron esters, aluminum chelates, aluminum alkoxides, aluminum esters, titanium chelates, titanium alkoxides, titanium esters, zirconium chelates, zirconium alkoxides, zirconium esters and nanoparticles of compounds of the elements aluminum, silicon, titanium or zirconium, for the crosslinking of the —Si(OR')$_{3-x}$ units, and (C) an aprotic solvent or a mixture of aprotic solvents, wherein the reactive groups (II) are crosslinked in the course of curing the coating material, and further wherein said cured layer has a thickness of at least 40 μm and exhibits properties upon nanoindentation testing as follows:

a. elastic volume recovery >86.5%,
b. plastic deformation <3.5%,
c. brittle deformation <10.0%.

* * * * *